(12) United States Patent
Wu et al.

(10) Patent No.: US 7,184,274 B2
(45) Date of Patent: Feb. 27, 2007

(54) FLASH MEMORY ENCRYPTION DEVICE

(76) Inventors: Victor Chuan-Chen Wu, 21055 Lauretta Dr., Cupertino, CA (US) 95014; Bill Kwong, 20363 Leutar Ct., Saratoga, CA (US) 95070

( * ) Notice: Subject to any disclaimer, the term of this patent is extended or adjusted under 35 U.S.C. 154(b) by 27 days.

(21) Appl. No.: 11/099,639

(22) Filed: Apr. 6, 2005

(65) Prior Publication Data
US 2006/0227519 A1    Oct. 12, 2006

(51) Int. Cl.
*H05K 7/02* (2006.01)
(52) U.S. Cl. .................... 361/752; 361/737; 361/730; 439/946; 235/492
(58) Field of Classification Search ............... 439/946, 439/638, 945; 361/737, 730, 736, 752; 174/50.52, 174/520; 235/492
See application file for complete search history.

(56) References Cited

U.S. PATENT DOCUMENTS

| | | | |
|---|---|---|---|
| 6,002,605 A * | 12/1999 | Iwasaki et al. ............... 365/51 |
| 6,137,710 A * | 10/2000 | Iwasaki et al. ............... 365/52 |
| 6,353,870 B1 * | 3/2002 | Mills et al. .................. 710/301 |
| 6,524,137 B1 * | 2/2003 | Liu et al. ..................... 439/638 |
| 6,681,991 B1 * | 1/2004 | Li .............................. 235/439 |
| 6,780,062 B2 * | 8/2004 | Liu et al. ..................... 439/630 |
| 2003/0074499 A1 * | 4/2003 | Chen et al. ................... 710/63 |

* cited by examiner

*Primary Examiner*—Tuan Dinh
*Assistant Examiner*—Dameon E. Levi
(74) *Attorney, Agent, or Firm*—Troxell Law Office, PLLC

(57) ABSTRACT

A flash memory encryption device that enables different types of flash memory cards to be conveniently inserted into or removed from, which comprising: a housing, having an upper housing and a lower cover that can be mutually engaged together for forming a room, wherein the housing further comprises a opening; a printed circuit board, disposed in the room; a first connector, disposed on the printed circuit board and exposed outward the opening for providing at least one memory card being inserted or removed; a controller, disposed on the printed circuit board and coupled to the first connector for receiving data from the first connector and executing encryption or decryption operation then output; and a second connector, disposed on the printed circuit board and coupled to the controller for connecting the flash memory encryption device to a host computer.

10 Claims, 4 Drawing Sheets

FLASH MEMORY ENCRYPTION DEVICE

BACKGROUND OF THE INVENTION

1. Field of the Invention

The present invention relates to a flash memory encryption device that enables various types of memory cards can be encrypted or decrypted so as to achieve the goal of protecting the data of the memory card.

2. Description of Related Art

Accompanying the science and technology developing, the memory card manufacturers had already produced many various type memory cards, such as SmartMedia, CompactFlash, MMC, Security Digital (SD), Memory Stick, Memory Stick Pro, xD or Microdrive, Memory Stick Duo and Memory Stick Pro Duo memory card etc., and many card reader were designed to read the data of the various data.

There were many multi-in-one flash memory card readers had been produced in the markets for reading various memory cards, such as SmartMedia, CompactFlash, MMC, Security Digital (SD), Memory Stick, Memory Stick Pro, xD or Microdrive, Memory Stick Duo and Memory Stick Pro Duo memory card etc. However, the prior art flash memory card readers did not have ability of protecting the data of the memory cards being misread by other users, so the memory card owner must keep his/her memory card very carefully, so as to prevent his/her memory card from losing, due to the data of the memory cards can be read from any flash memory card reader, therefore, the prior art flash memory card readers could not meet the requirement of data security.

There is therefore a need for a new and improved strategy and technique for overcoming these deficiencies and the present invention overcomes these deficiencies in a new and novel fashion.

SUMMARY OF THE INVENTION

The present invention generally relates to a strategy and a technique, which overcomes some or all of the above referenced deficiencies associated with prior memory card reader.

It is a first non-limited object of the present invention is to provide a flash memory encryption device that enables various types of memory cards can be encrypted or decrypted.

According to one non-limited embodiment of the present invention, the flash memory encryption device comprises: a housing, having an upper housing and a lower cover that can be mutually engaged together for forming a room, wherein the housing further comprises a opening; a printed circuit board, disposed in the room; a first connector, disposed on the printed circuit board and exposed outward the opening for providing at least one memory card being inserted or removed; a controller, disposed on the printed circuit board and coupled to the first connector for receiving data from the first connector and executing encryption or decryption operation then output; and a second connector, disposed on the printed circuit board and coupled to the controller for connecting the flash memory encryption device to a host computer.

BRIEF DESCRIPTION OF THE DRAWINGS

The present invention can be more fully understood by reference of the following description and accompanying drawings, in which.

DETAILED DESCRIPTION OF THE PREFERRED EMBODIMENTS

Figure 1:
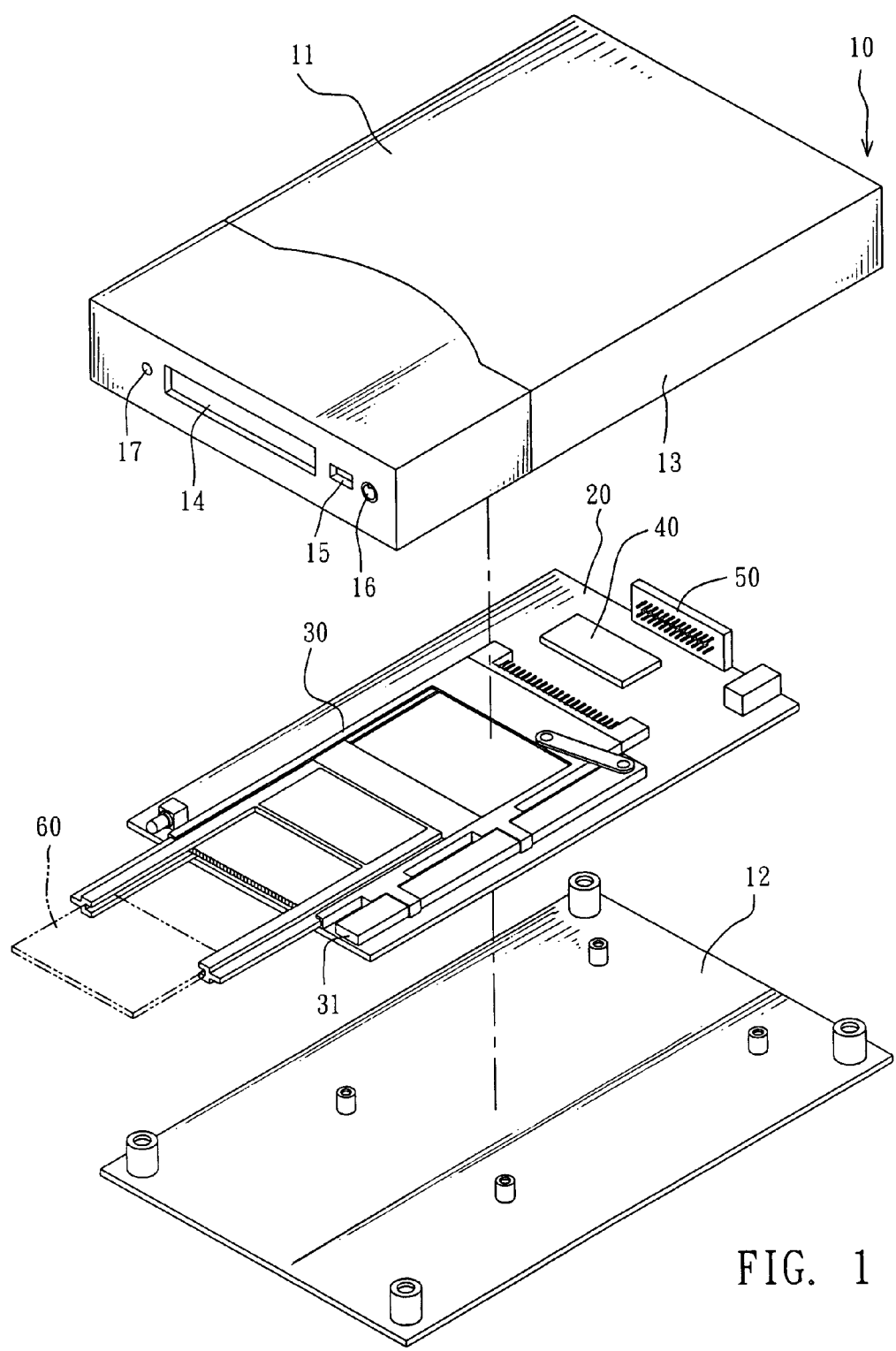
FIG. 1 illustrates an explosive appearance of the flash memory encryption device in accordance with one embodiment of the present invention.

Referring to FIG. 1, which illustrates an explosive appearance of the flash memory encryption device in accordance with one embodiment of the present invention; as shown in FIG. 1, the flash memory encryption device of the present invention that enables different types of flash memory cards to be conveniently inserted into or removed from, which comprising: a housing 10; a printed circuit board 20; a first connector 30; a controller 40 and a second connector 50.

Wherein, the housing 10 is made of plastic material, preferably, and has an upper housing 11 and a lower cover 12 that can be mutually engaged together for forming a room 13, wherein the housing 10 further comprises a first opening 14, second opening 15, third opening 16 and a hole 17 disposed at the front side of the upper housing 11; wherein, the first opening 14 is used for providing a memory card 60 being inserted into or removed from the first connector 30. Wherein, the memory card 60 can be SmartMedia, CompactFlash, MMC, Security Digital (SD), Memory Stick, Memory Stick Pro, xD or Microdrive memory card.

The printed circuit board 20 is disposed in the room 13 for conveying the first connector 30, controller 40 and second connector 50.

The first connector 30 is disposed on the printed circuit board 20 and exposed outward the opening 14 for providing at least one memory card 60 being inserted into or removed from the first connector 30. The first connector 30 further comprises a eject mechanism 31 exposed outward from the second opening 15 for ejecting the memory card 60 out from the first connector 30. Furthermore, for the purpose of fitting the various memory cards 60, the first connector 30 further comprised certain mechanism 32 (please refer to FIG. 2). Wherein, the first connector 30 is a PCMCIA connector with IDE interface.

The controller 40 is disposed on the printed circuit board 20 and coupled to the first connector 30 for receiving data from the memory card 60 inserted into the first connector and executing encryption or decryption operation then output to the second connector 50. Wherein the controller 40 is an Application Specification Integrated Circuit (ASIC) with IDE interface and has data encryption and decryption ability.

The second connector 50 is disposed on the printed circuit board 20 and coupled to the controller 40 for connecting the flash memory encryption device of the present invention to a host computer (figure not shown). Wherein, the second connector 50 is a SATA, IDE, SCSI, USB, Firewire or USIB interface and the IDE is preferably for matching to the controller 40.

Figure 2:
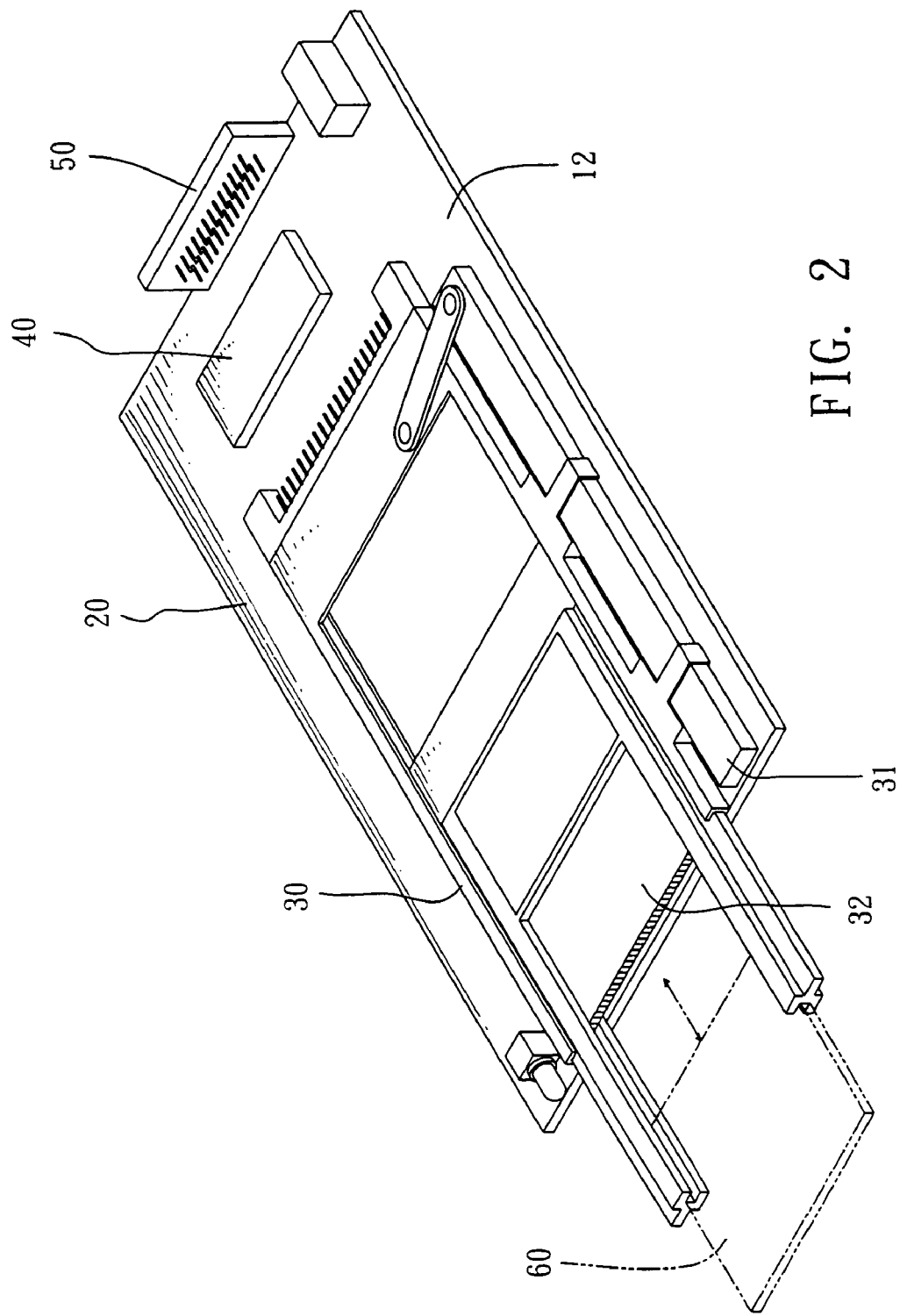
FIG. 2 illustrates the enlarge appearance of the first connector 30 in accordance with one embodiment of the present invention.

Referring to FIG. 2, which illustrates the enlarge appearance of the first connector 30 in accordance with one embodiment of the present invention; as shown in the FIG. 2, for the purpose of fitting the various memory cards 60, such as SmartMedia, CompactFlash, MMC, Security Digital (SD), Memory Stick, Memory Stick Pro, xD or Microdrive memory card, the first connector 30 further comprised certain mechanism 32 disposed inside the first connector 30. Wherein, mechanism 32 is a prior art of the connector so the description will not discuss detail here.

Figure 3:
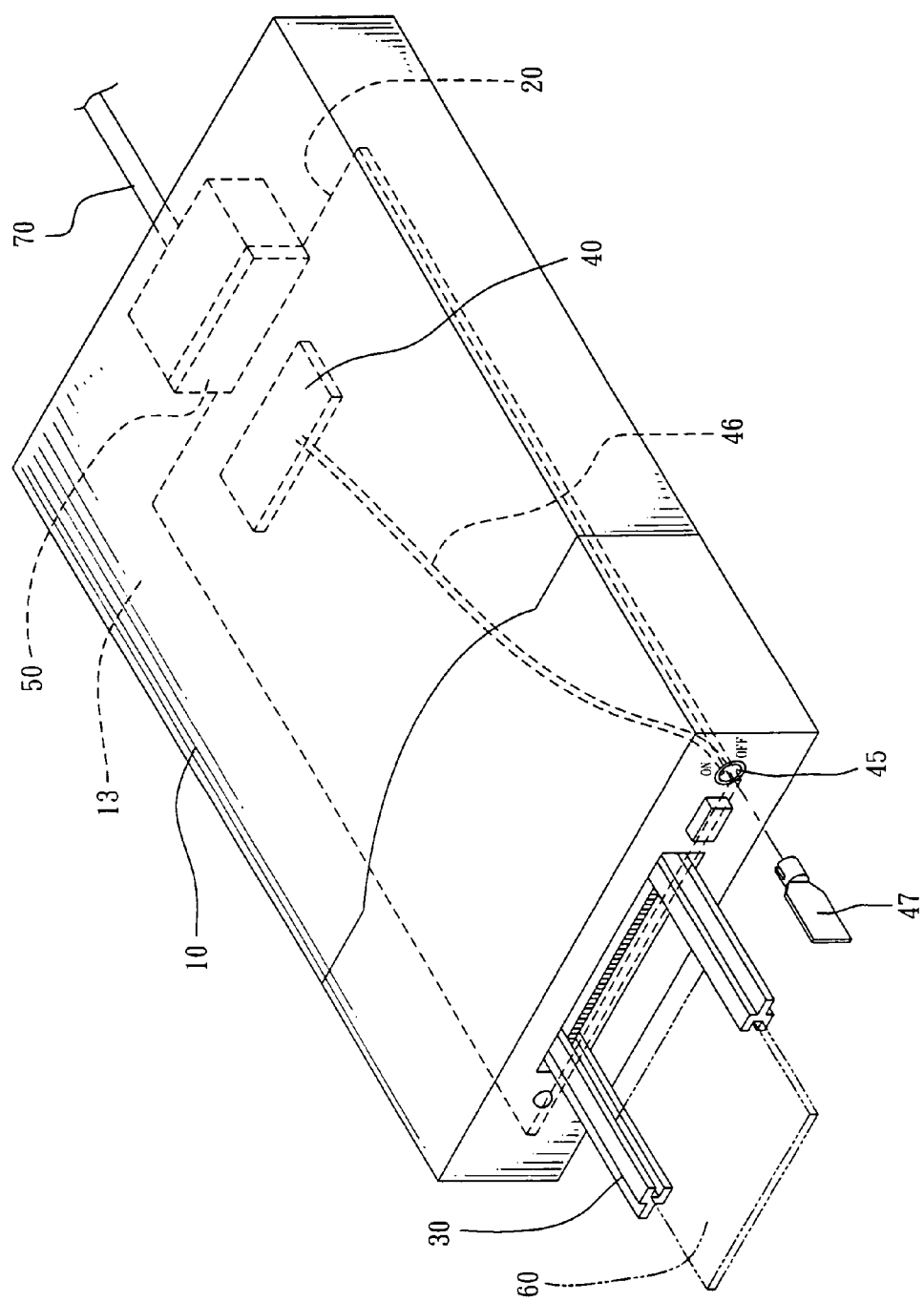
FIG. 3 illustrates an assembly appearance of the flash memory encryption device in accordance with one embodiment of the present invention.

Referring to FIG. 3, which illustrates assembly appearance of the flash memory encryption device in accordance with one embodiment of the present invention; as shown in FIG. 3, while assembling the flash memory encryption device of the present invention, the printed circuit board 20 with the first connector 30, controller 40 and second connector 50 is firstly disposed and fastened in the room 13 of the lower housing 12, and then covers the upper housing 11 to the lower housing 12 and let the first connector 30 be exposed outward the opening 14 so as to conveniently the memory card 60 to be inserted or removed form the first connector 30.

For controlling the controller 40 to execute data encryption/decryption function, the flash memory encryption device of the present invention further comprises a lock seat 45 protruded from the third opening 16 and coupled to the controller 40 through wires 46; whereby a key 47 can be inserted into the lock seat 45 for controlling the controller 40 whether to execute encryption/decryption data function or not. The controller 40 executes data encryption/decryption function when the key 47 is inserted into the lock seat 45 and turned to an on position, and the controller 40 does not execute the data encryption/decryption function when the lock seat 45 is turned off, so the flash memory encryption device of the present invention could execute data encryption/decryption function to the memory card 60 according the status of the lock seat 45.

Furthermore, the flash memory encryption device of the present invention further comprises an indicator, for example but not limited to a LED, disposed on the front edge of the printed circuit board 20 and protruded from the hole 17 for indicating the access status of the flash memory encryption device.

While operating, the user can connect a cable 70 between the second connector 50 of the flash encryption device of the present device to a host computer (figure not shown), and insert a memory card 60, for example but not limited to a CompactFlash memory card into the first connector 30, then inserts the key 47 into the lock seat 45 and switches the key 47 to the on position, then the data wrote to/read from the memory card 60 will be encrypted/decrypted and the memory card 60 can not be read without using the key 47 of the flash encryption device of the present device so as to achieve the goal of protecting the data of the memory card 60.

Figure 4:
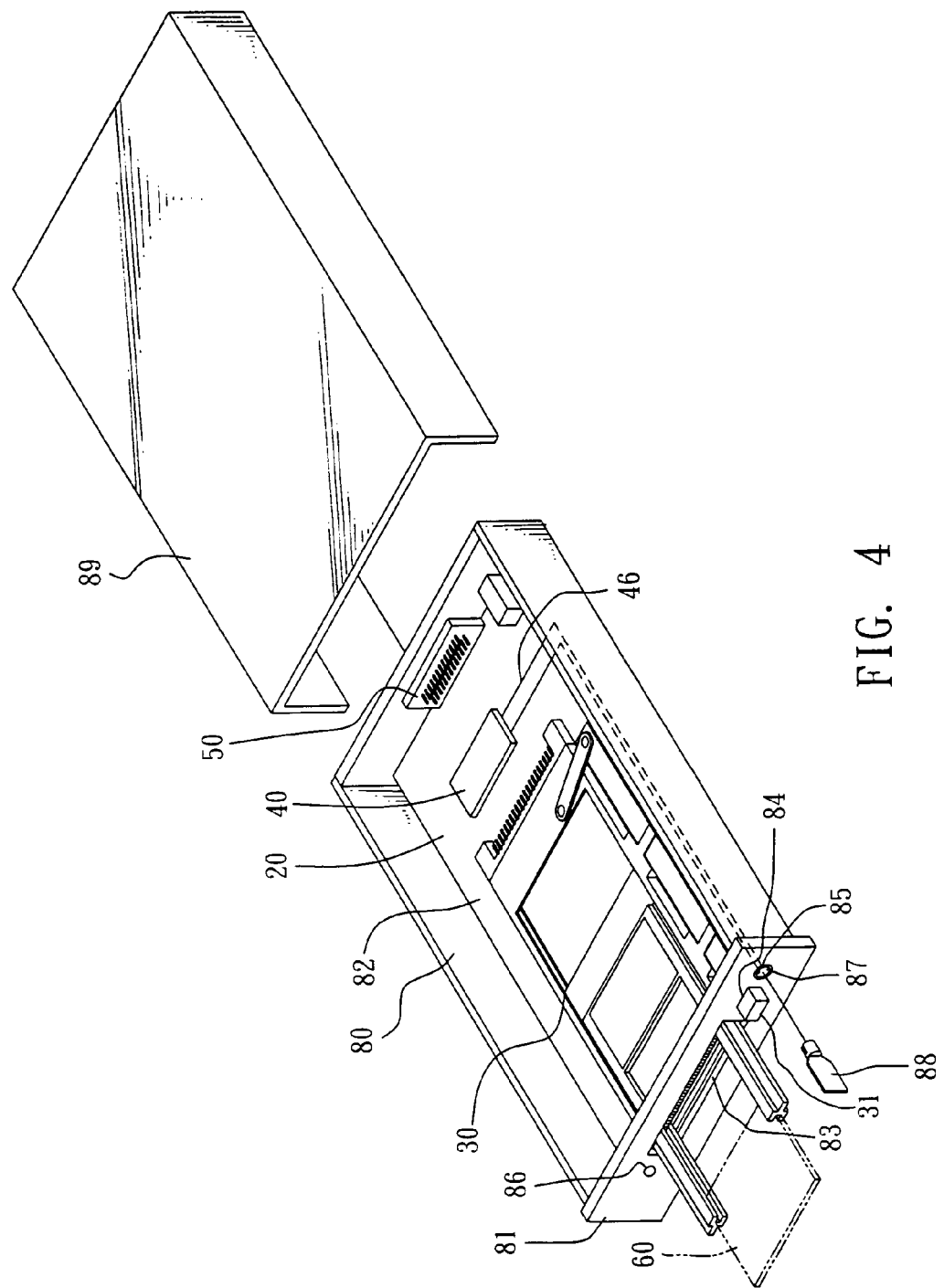
FIG. 4 illustrates an assembly appearance of the flash memory encryption device in accordance with another embodiment of the present invention.

Referring to FIG. 4, which illustrates an assembly appearance of the flash memory encryption device in accordance with another embodiment of the present invention; as shown in FIG. 4, the flash memory encryption device of the present invention that enables different types of flash memory cards to be conveniently inserted into or removed from, which comprising: a housing 80; a printed circuit board 20; a first connector 30; a controller 40 and a second connector 50.

Wherein the printed circuit board 20, first connector 30, controller 40 and second connector 50 has the same function as these parts with same titles shown in FIG. 1, so please refer to above mention.

The housing 80 can be fitted in a computer housing (not shown), such as a standard 3.5" drive bay, having a front panel 81 and a room 82, wherein the front panel 81 can be exposed from the computer housing 80 and further comprises a first opening 83, second opening 84, third opening 85 and a hole 86.

Wherein, the first connector 30 is disposed on the printed circuit board 20 and exposed outward the opening 83 for providing at least one memory card 60 being inserted into or removed from the first connector 30. The first connector 30 further comprises a eject mechanism 31 exposed outward from the second opening 84 for ejecting the memory card 60 out from the first connector 30. Wherein, the first connector 30 is a PCMCIA connector with IDE interface and the second connector is a SATA, IDE, SCSI, USB, Firewire or USIB interface, preferably.

For controlling the controller 40 to execute data encryption/decryption function, the flash memory encryption device of the present invention further comprises a lock seat 87 protruded from the third opening 85 and coupled to the controller 40 through wires 46; whereby a key 88 can be inserted into the lock seat 87 for controlling the controller 40 whether to execute encryption/decryption data function or not. The controller 40 executes data encryption/decryption function when the key 88 is inserted into the lock seat 87 and turned to an on position, and the controller 40 does not execute the data encryption/decryption function when the lock seat 87 is turned off, so the flash memory encryption device of the present invention could execute data encryption/decryption function to the memory card 60 according the status of the lock seat 87.

While assembling the flash memory encryption device of the present invention, the printed circuit board 20 with the first connector 30, controller 40 and second connector 50 is firstly disposed and fastened in the room 82 of the housing 80, and then inserts the housing 80 into a standard 3.5" drive bay of the computer housing (not shown) and let the first connector 30 be exposed outward the opening 83 so as to conveniently the memory card 60 to be inserted or removed form the first connector 30, finally, connects a cable 70 between the second connector 50 to the host computer (not shown).

While operating, the user can insert a memory card 60, for example but not limited to a CompactFlash memory card into the first connector 30, then inserts the key 88 into the lock seat 87 and switches the key 88 to the on position, then the data wrote to/read from the memory card 60 will be encrypted/decrypted and the memory card 60 can not be read without using the key 88 of the flash encryption device of the present device so as to achieve the goal of protecting the data of the memory card 60.

Furthermore, the flash memory encryption device of the present invention further comprises a cover 89 that can be removably covered over the housing 80 for protecting the dust inside the computer housing (not shown).

While the invention has been disclosed with reference to preferred embodiments thereof, it is to be understood that modifications or variations may be easily made without departing from the spirit of this invention, which is defined in the appended claims.

What is claimed is:

1. A flash memory encryption device for use with a host computer and accommodating different types of memory cards, the flash memory encryption device comprising:
   a) a housing having an interior, a first opening, a second opening, a third opening, and a hole located on a front of the housing;
   b) a printed circuit board located in the interior of the housing;
   c) a first connector located on the printed circuit board and aligning with the first opening, the first connector having an eject mechanism extending outwardly from the second opening, at least one memory card of the different types of memory cards selectively inserted into and removed from the first connector through the first opening;
   d) a controller located on the printed circuit board and electrically connected to the first connector and receiving data therefrom, the controller selectively performing an encryption and decryption operation and transmitting output data;
   e) a second connector located on the printed circuit board and electrically connected to the controller and the host computer;
   f) a lock seat extending outwardly from the third opening and electrically connected to the controller; and
   g) a key removably inserted into the lock seat and selectively turning on and off the encryption and decryption operation of the controller.

2. The flash memory encryption device according to claim 1, wherein the housing is made of plastic.

3. The flash memory encryption device according to claim 1, wherein the housing is made of plastic and is sized to fit in a standard 3.5" drive bay of a computer housing of the host computer.

4. The flash memory encryption device according to claim 1, wherein the housing has an upper housing and a lower cover forming the interior thereof.

5. The flash memory encryption device according to claim 1, wherein the housing has a removable cover.

6. The flash memory encryption device according to claim 1, further comprising an indicator located in the hole of the housing and electrically connected to the controller indicating access status thereof.

7. The flash memory encryption device according to claim 1, wherein the first connector is a PCMCIA connector having a mechanism accommodating the different types of memory cards.

8. The flash memory encryption device according to claim 1, wherein the first connector has an IDE interface.

9. The flash memory encryption device according to claim 1, wherein the controller is an Application Specification Integrated Circuit.

10. The flash memory encryption device according to claim 1, wherein the second connector is selected from a group consisting of SATA, IDE, SCSI, USB, Firewire, and USIB interfaces.

* * * * *